(12) United States Patent
Daigle et al.

(10) Patent No.: US 10,927,978 B1
(45) Date of Patent: Feb. 23, 2021

(54) LOW-PROFILE CASING SPACER ROLLER FOR HIGH-CAPACITY LOADS

(71) Applicants: Damian Daigle, Rayne, LA (US); Joseph E. Wilson, Lafayette, LA (US); Miguel Regato, Youngsville, LA (US); Tom Forlander, Lafayette, LA (US)

(72) Inventors: Damian Daigle, Rayne, LA (US); Joseph E. Wilson, Lafayette, LA (US); Miguel Regato, Youngsville, LA (US); Tom Forlander, Lafayette, LA (US)

( * ) Notice: Subject to any disclaimer, the term of this patent is extended or adjusted under 35 U.S.C. 154(b) by 0 days.

(21) Appl. No.: 16/602,004

(22) Filed: Jul. 22, 2019

Related U.S. Application Data

(63) Continuation of application No. 15/164,852, filed on May 25, 2016, now abandoned.

(60) Provisional application No. 62/166,088, filed on May 25, 2015.

(51) Int. Cl.
  *F16L 9/18* (2006.01)
  *F16L 3/08* (2006.01)

(52) U.S. Cl.
  CPC ........................... *F16L 3/08* (2013.01)

(58) Field of Classification Search
  CPC ........................................................ F16L 3/08
  See application file for complete search history.

(56) References Cited

U.S. PATENT DOCUMENTS

| | | | |
|---|---|---|---|
| 1,122,130 A | 12/1914 | Lamson | |
| 1,906,209 A | 4/1933 | Harding et al. | |
| 2,531,658 A | 11/1950 | Walsh | |
| 2,706,496 A | 4/1955 | Bond | |
| 2,897,581 A * | 8/1959 | Cowles | F16C 19/466 29/898.061 |
| 3,379,027 A * | 4/1968 | Mowell | F16L 3/18 62/50.7 |
| 3,725,567 A | 4/1973 | Olsen et al. | |
| 3,786,379 A | 1/1974 | Lutchansky | |
| 4,231,622 A * | 11/1980 | Paullin | F16C 19/548 384/249 |
| 4,335,267 A | 6/1982 | Hopkins | |
| 5,441,082 A | 8/1995 | Eskew et al. | |
| 5,791,380 A | 8/1998 | Onan et al. | |
| 5,915,703 A * | 6/1999 | Wrike | A63C 17/06 280/11.231 |
| 5,979,508 A * | 11/1999 | Cherrington | F16L 35/00 138/108 |
| 6,003,559 A | 12/1999 | Baker | |
| 6,158,475 A * | 12/2000 | Clemmer | F16L 7/00 138/108 |
| 6,571,832 B1 | 6/2003 | Elliott | |
| 6,736,166 B2 | 5/2004 | Calais et al. | |

(Continued)

*Primary Examiner* — James F Hook
(74) *Attorney, Agent, or Firm* — Greg Mier

(57) ABSTRACT

A casing spacer equipped with low-profile, high-load-capacity roller assemblies that require less force to install a carrier pipe inside a casing pipe. The low-profile, high-load-capacity roller assemblies are manufactured from a material designed to carry a heavy load, which material will not wear away as the carrier pipe is pushed or pulled through the casing pipe. The wheels of the low-profile, high-load-capacity roller assemblies are manufactured from an electronically isolating material to prevent contact of dissimilar metals, thereby mitigating galvanic corrosion.

21 Claims, 9 Drawing Sheets

(56) References Cited

U.S. PATENT DOCUMENTS

| | | | |
|---|---|---|---|
| 7,225,837 B1 * | 6/2007 | Kane | ............ F16L 7/00 138/108 |
| 7,647,947 B1 | 1/2010 | Littlebrant | |
| 2003/0146586 A1 * | 8/2003 | Hurwitz | ......... A63C 17/0066 280/11.221 |

* cited by examiner

LOW-PROFILE CASING SPACER ROLLER FOR HIGH-CAPACITY LOADS

CROSS REFERENCE TO RELATED APPLICATIONS

The present application claims priority from non-provisional patent application Ser. No. 15/164,852, filed on May 25, 2016.

The present application claims priority from provisional patent application No. 62/166,088, filed on May 25, 2015.

FIELD OF THE INVENTION

The subject invention relates generally to spacers for positioning pipe within casings. More particularly, the subject invention relates to a casing spacer equipped with low-profile, high-load-capacity rollers.

BACKGROUND OF THE INVENTION

Carrier pipes such as those used in municipal water systems often encounter significant dynamic and static loads, corrosive elements, vibrations, and other destructive forces associated with aggressive underground environments. In such underground environments, whether under roads, railway rights-of-way, or other underground locations, carrier pipes are generally more prone to failure, leakage-producing deformation, and degradation over time.

To prolong the serviceability of carrier pipes, they are typically placed inside a casing, which serves to insulate and protect carrier pipes from external environmental forces. The casing isolates the carrier pipe from the elements as well as from ground movement and the structural stresses associated therewith. However, simply placing a carrier pipe inside a casing does not eliminate all of the destructive forces on the carrier pipe. If the carrier pipe is not properly spaced within the casing and allowed to come into contact with the casing, then the carrier pipe can be subjected to galvanic and chemical reactions between the carrier pipe and the casing. These reactions can lead to failure, leakage-producing deformation, and degradation over time.

Casing spacers have been introduced to position carrier pipes in a desired location or alignment within a casing, or in the case of gravity flow lines, to maintain the carrier pipe at a desired grade or position along the length of the casing. Conventional casing spacers include the "band and boards" systems in which suitably sized lumber may be banded about desired portions of the carrier pipe before it is placed in the casing. The lumber tends to degrade over time, however, and may be destroyed or inadvertently displaced during installation. Such wooden spacers also typically result in high labor costs, because they require generally three to six workers and considerable coordination and planning to install. In addition, wooden spacers are easily dislodged and they place an uneven load on the carrier pipe unless the boards are spaced symmetrically. The wooden spacers may rot and allow settlement, or they can, on the other hand, swell and subject carrier pipe joints to breakage. Wooden spacers do not provide complete assurance of electrical insulation, and chemically, they allow bacteria and differential oxygen concentration corrosion.

Wooden spacers have generally been replaced with casing spacers comprised of stainless steel, galvanized steel, or epoxy coated steel. This type of casing spacer employs two or more shell members each including an inner portion disposed about and engaging the carrier pipe and an outer portion engaging the inner surface of the casing. The shell members are securely coupled together and attached about the carrier pipe by means of plural nut and bolt combinations, with each shell member's inner portion being arcuate in shape and its outer portion including multiple spaced ribs attached to and extending outwardly from the inner portion and engaging the casing's inner surface. These spaced ribs are commonly called "risers."

An example of this later type of casing spacer can be found in U.S. Pat. No. 6,571,832, issued on Jun. 3, 2003. These type casing spacers do not completely eliminate problems that arise during installation of the casing spacers inside a casing because of friction between the end of the riser and the inner surface of the casing. The friction can result in destruction of the casing spacer and undue difficulty during installation of the casing spacer. The present invention is designed to eliminate the problems caused by friction during installation of the casing spacer.

BRIEF DESCRIPTION OF THE ATTACHED DRAWINGS

The accompanying drawings are provided for the purpose of illustration only and are not intended as a definition of the limits of the present invention. The drawings illustrate a preferred embodiment of the present invention, wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
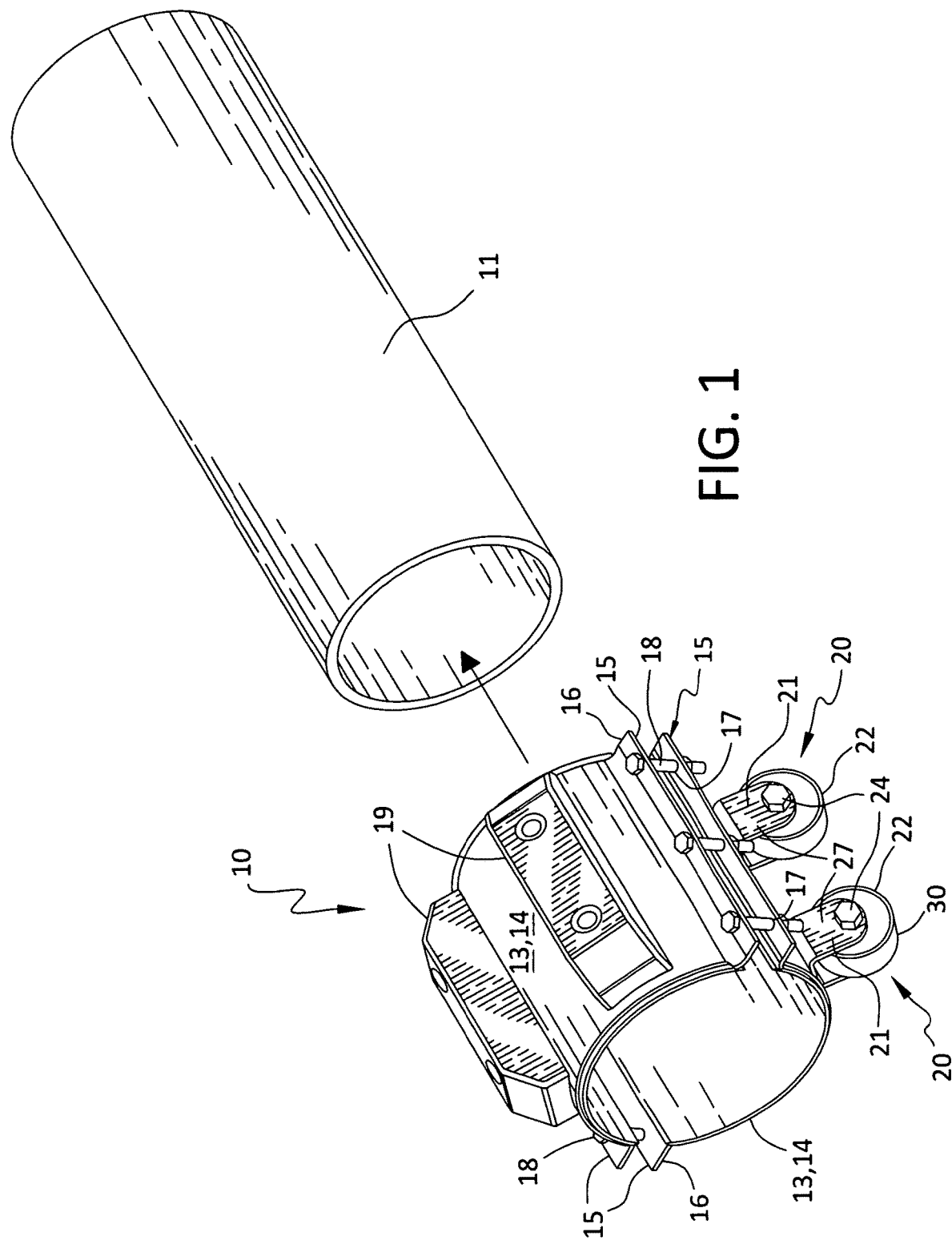
FIG. 1 is a perspective view showing low-profile casing spacer roller assemblies and a set of runners attached directly to the casing spacer band of a casing spacer next to a carrier pipe.
Figure 2:
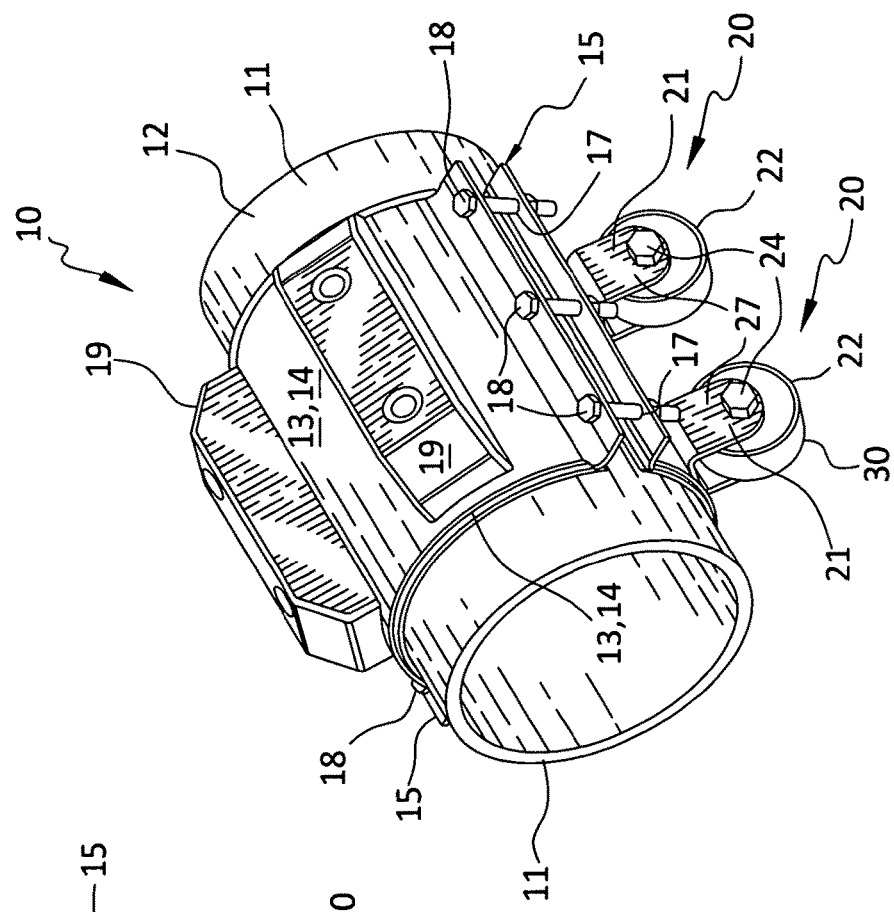
FIG. 2 is a perspective view showing low-profile casing spacer roller assemblies and a set of runners attached directly to the casing spacer band of a casing spacer.
Figure 3:
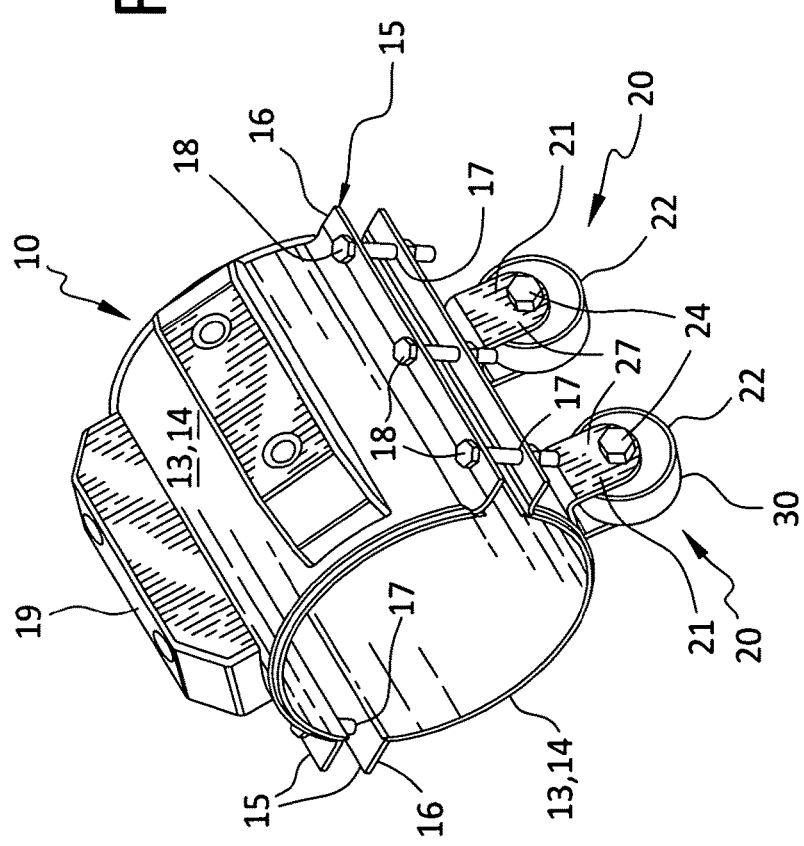
FIG. 3 is a perspective view showing low-profile casing spacer roller assemblies and a set of runners attached directly to the casing spacer band of a casing spacer installed on a carrier pipe.

FIG. 1 shows one embodiment of the casing spacer 10 of the present invention, which is designed to fit around a carrier pipe 11, as shown in FIG. 3. FIGS. 4, 8, 9, and 10 show multiple embodiments of casing spacer 10 fit around a carrier pipe 11 inside a carrier pipe 29.

As shown in FIGS. 1 through 11, casing spacer 10 is preferably equipped with low-profile, high-load-capacity roller assemblies 20 that enable a carrier pipe 12 to be pushed or pulled inside a casing pipe 29 with less force. As shown in FIGS. 1 through 4 and 9 and 10, casing spacer 10 can also be equipped with a set of runners 19 that help lower the coefficient of friction between the casing spacer 10 and the casing pipe 29 as the carrier pipe 12 is pushed or pulled through the casing pipe 29. Roller assemblies 20 are preferably designed to carry a heavy load as the carrier pipe 12 is pushed or pulled through the casing pipe 29.

Existing rollers that are commercially available in the market place are manufactured with large wheels and tall brackets. The wheel size and bracket height increase with the size of the load to be supported by the casing spacer. The casing spacer 10 of the present invention provides low-profile roller assemblies 20 that can handle high capacity loads in a smaller annular space than the existing commercially available rollers.

Figure 4:
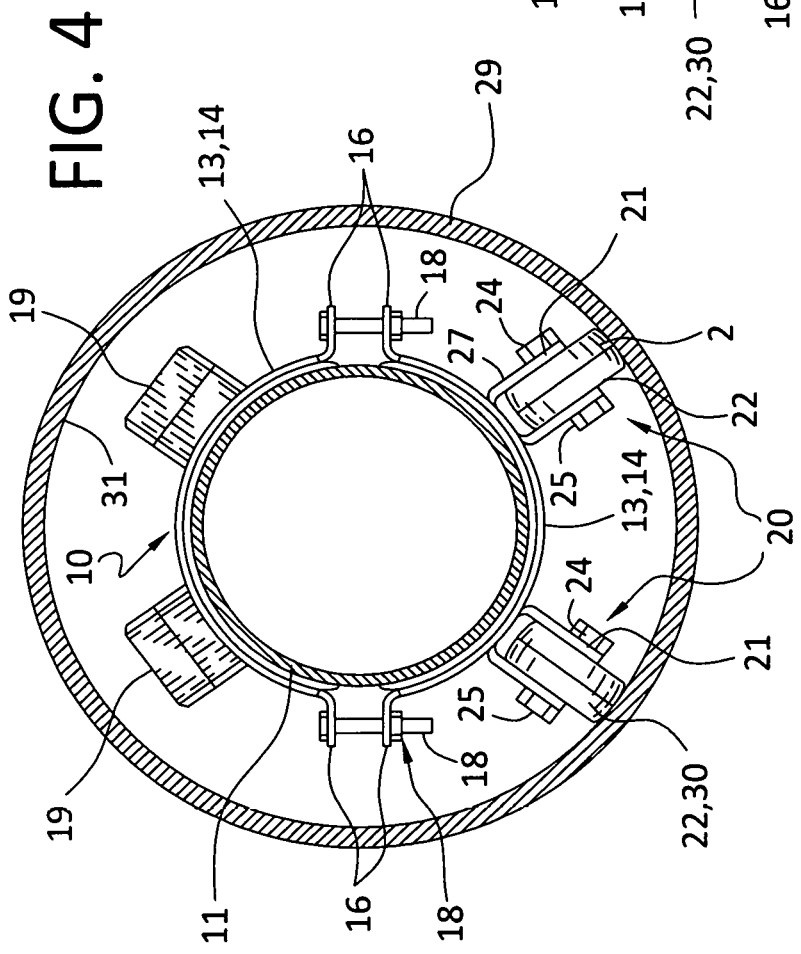
FIG. 4 is an end view showing low-profile casing spacer roller assemblies and a set of runners attached directly to the casing spacer band of a casing spacer installed on a carrier pipe inside a casing.
Figure 5:
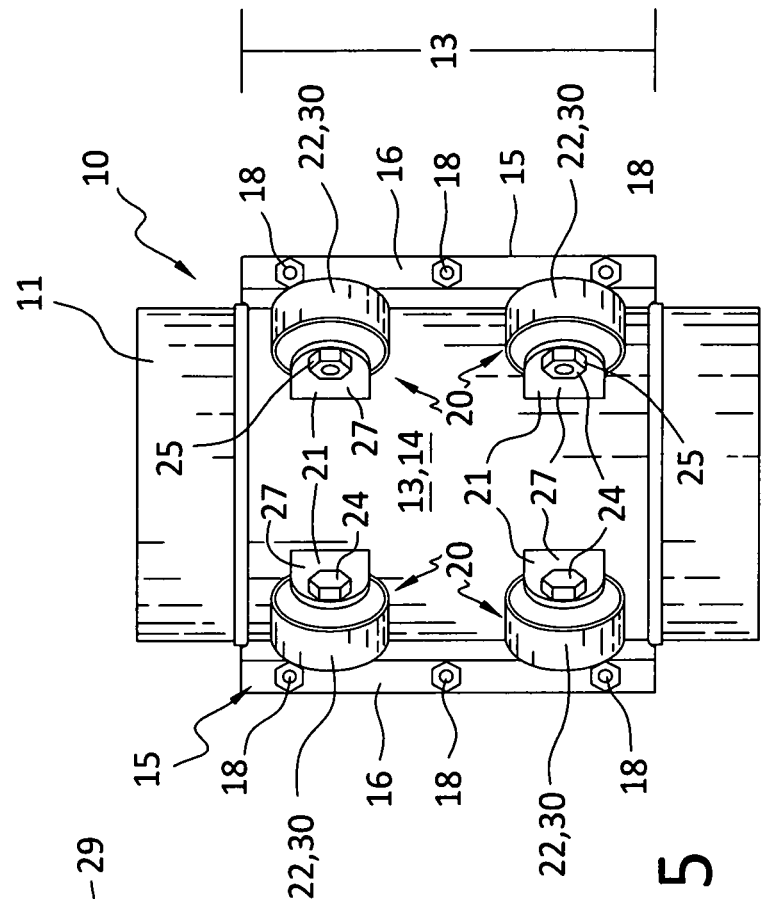
FIG. 5 is a bottom view showing low-profile casing spacer roller assemblies attached directly to the casing spacer band of a casing spacer installed on a carrier pipe.

Casing spacer 10 preferably includes a casing spacer band 12. Casing spacer band 12 is preferably formed from a sheet of metal, such as raw steel or stainless steel, but can be made of other materials, such as plastic. If the casing spacer band 12 is formed from a sheet of metal, then the thickness of the sheet of metal is preferably fourteen gauge, but the thickness can vary depending on the size of casing spacer 10. As shown in FIG. 5, the width 13 of casing spacer band 12 is preferably between eight and twelve inches, but width 13 can vary depending on the size of carrier pipe 11 on which casing spacer 10 will be installed. As shown in FIGS. 1, 2, 3, 4, 8, 9, and 10, casing spacer band 12 preferably includes two or more sections 14, depending on the size of carrier pipe 11 on which casing spacer 10 will be installed. Each section 14 of casing spacer band 12 is preferably rolled to give it a semi-circular shape to match the circular shape of carrier pipe 11, as shown in FIGS. 3, 4, 8, 9, and 10. Each short end 15 of the semi-circular section 14 of casing spacer band 12 is preferably bent and formed into a flange 16 with holes 17 to receive fasteners 18 to join adjacent semi-circular sections 14 of casing spacer band 12 around carrier pipe 11, as shown in FIGS. 1 through 5 and 8 through 10.

Figure 9:
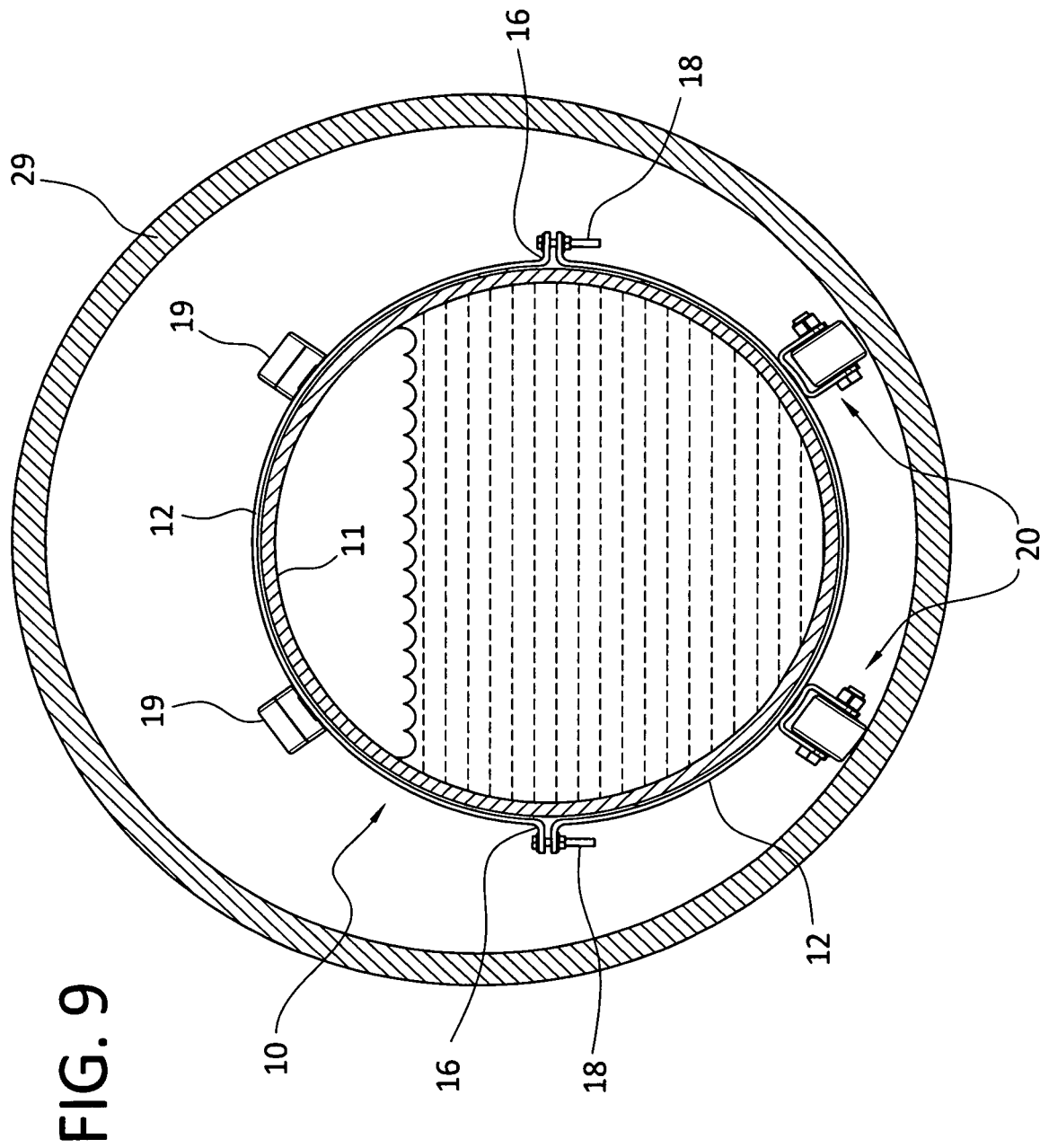
FIG. 9 is an end view showing low-profile casing spacer roller assemblies and a set of runners attached directly to the casing spacer band of a casing spacer installed on a carrier pipe inside a casing.
Figure 10:
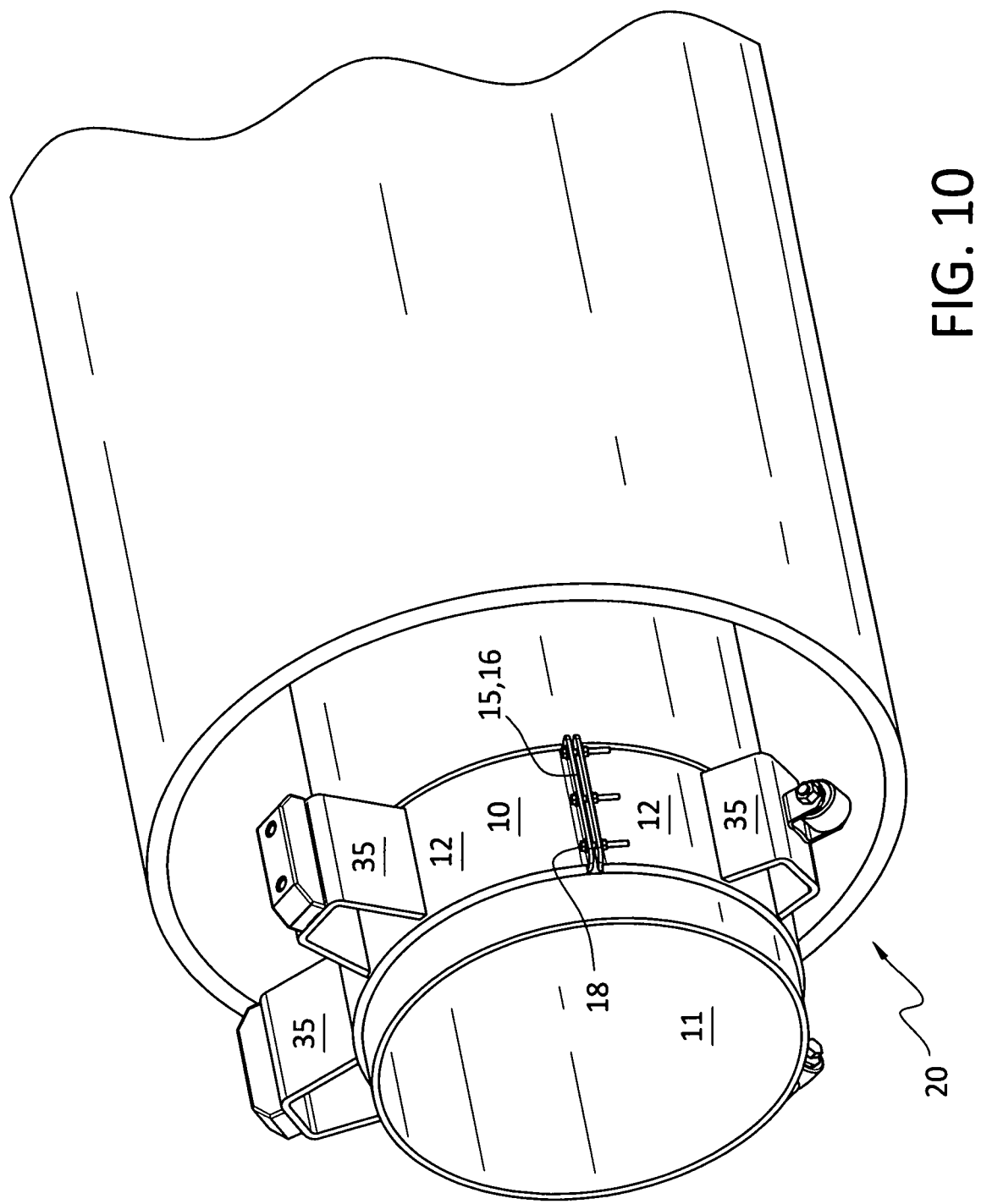
FIG. 10 is a perspective view showing low-profile casing spacer roller assemblies and a set of runners attached to risers that are attached directly to the casing spacer band of a casing spacer inside a carrier pipe.
Figure 12:
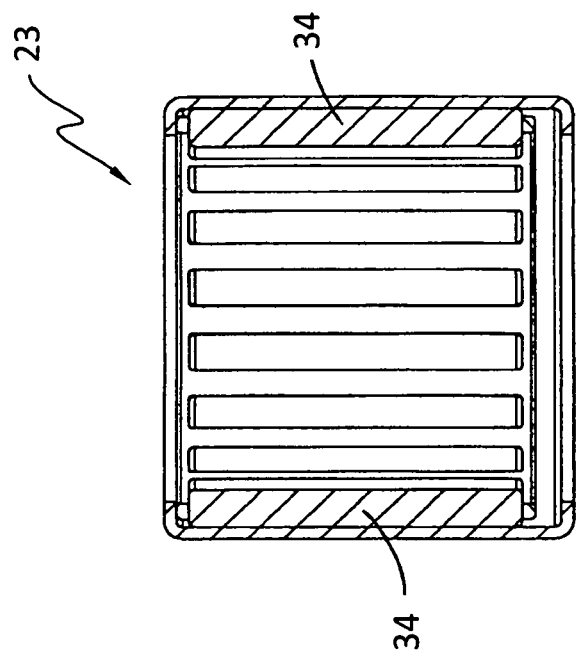
FIG. 12 is end view showing a section of a needle bearing assembly taken along 12-12 of FIG. 11.
Figure 11:
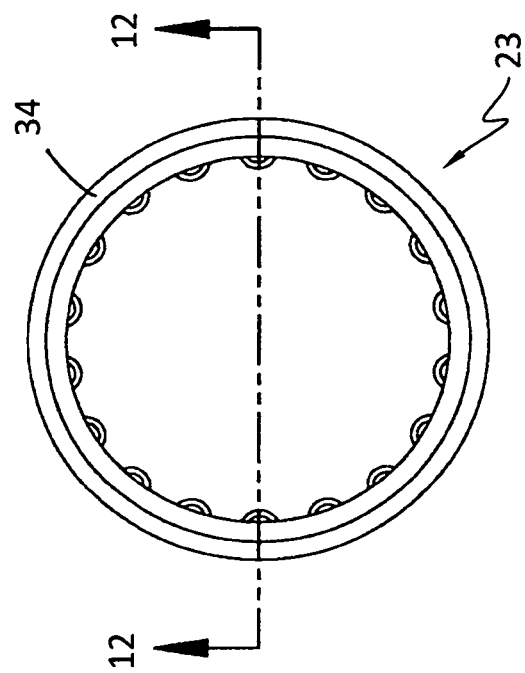
FIG. 11 is a side view of a needle bearing assembly.

As shown in FIGS. 1 through 5 and 8 and 9, the preferred embodiment of casing spacer 10 has roller assemblies 20 attached directly to casing spacer band 12. As shown in FIGS. 1 through 4 and 9, the preferred embodiment of casing spacer 10 may also have multiple runners 19 attached directly to casing spacer band 12. As shown in FIG. 10, an alternative embodiment of casing spacer 10 has multiple risers 35 attached directly to casing spacer band 12, with a roller assembly 20 or a runner 19 attached to each riser 35.

As shown in FIGS. 1 through 10, roller assemblies 20 preferably include five primary components, namely, a roller mount 21, a wheel 22, one or more needle bearings 23, a shoulder bolt 24, and an axle nut 25.

Roller mount 21 is preferably manufactured from a sheet of steel or stainless steel but can be manufactured from other similar materials. The thickness of the sheet of material can vary depending on the anticipated weight of the load bearing on roller assemblies 20. Roller mount 21 is preferably cut or punched from the sheet of steel, stainless steel, or similar material, and then bent into a C-shaped channel having a top 26 and two sides 27, as shown in FIGS. 1 through 10.

An alternative method of manufacturing roller mount 21 is to cut or punch three separate pieces and then combine the three pieces, by welding or other means, into a C-shaped channel having a top 26 and two sides 27.

Roller mount 21 is sized to provide adequate clearances on the sides and top of wheel 22, along with proper clearances between wheel 22 and carrier pipe 11. Sides 27 of roller mount 21 have holes 28 to accommodate shoulder bolt 24 for each wheel 22 assembled onto roller mount 21.

After roller mount 21 is shaped into a C-shaped channel, top 26 of roller mount 21 can be attached to casing spacer band 12, as shown in FIGS. 1 through 8, by welding or other means, in a desired location, which is typically determined by the circumstances in which casing spacer 10 will be used. If more space is needed between wheel 22 and casing spacer band 12, then roller mount 21 can also be attached by welding or other means to a runner 19 that is attached to casing spacer band 12, as shown in FIGS. 9 and 10.

Figure 7:
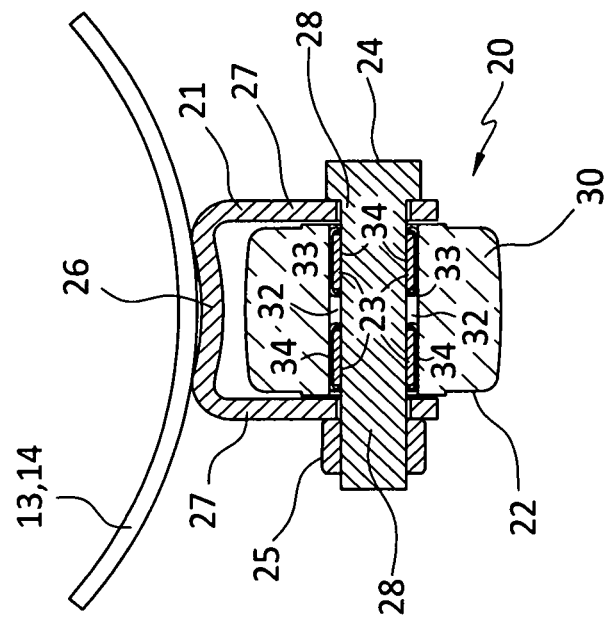
FIG. 7 is end view showing a section of a low-profile casing spacer roller taken along 7-7 of FIG. 6.
Figure 6:
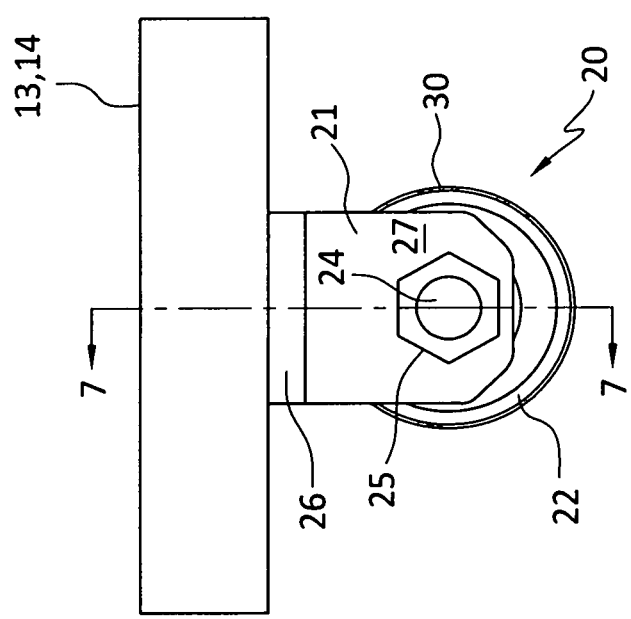
FIG. 6 is a side view showing a low-profile casing spacer roller.
Figure 8:
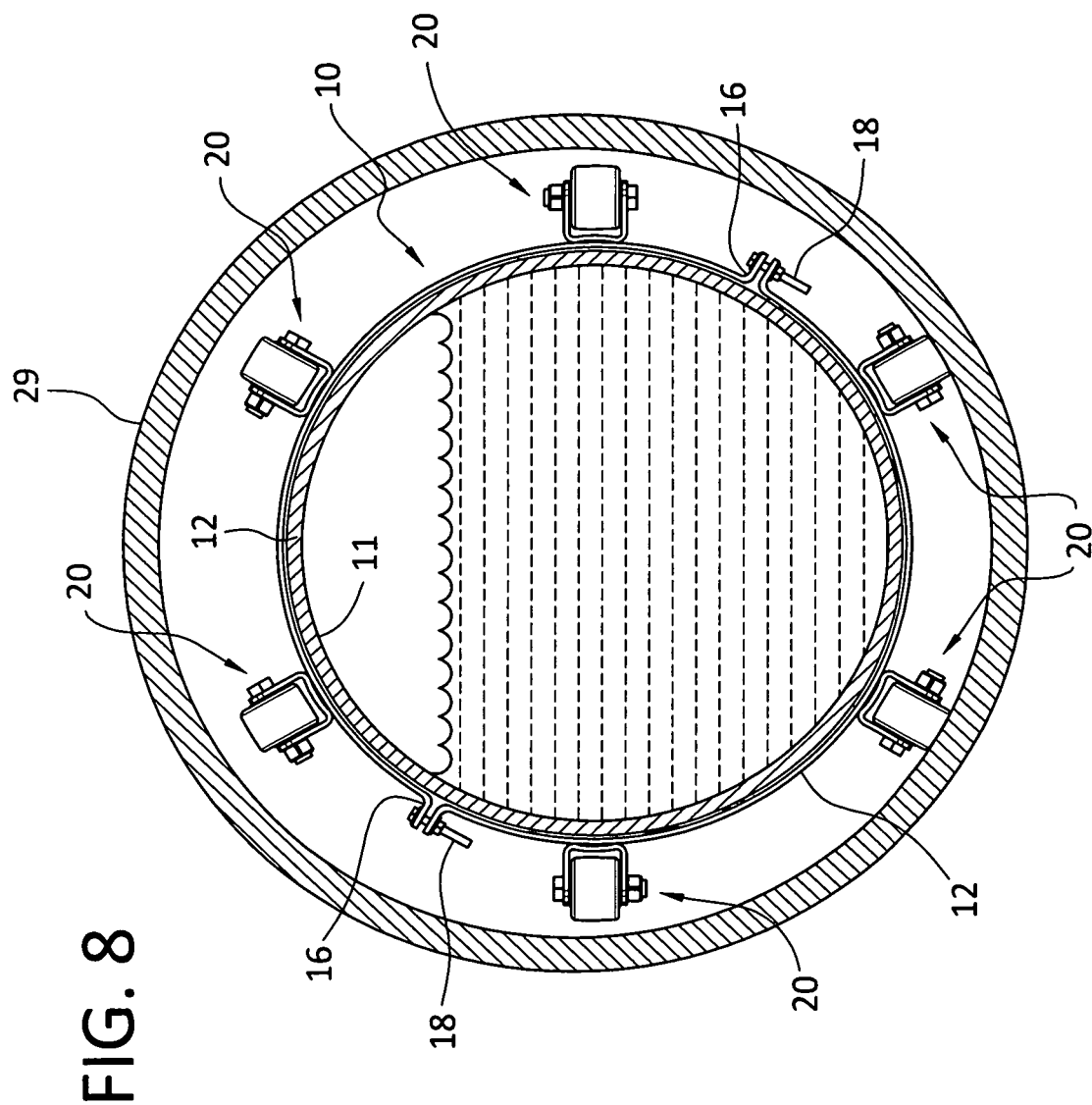
FIG. 8 is an end view showing low-profile casing spacer roller assemblies attached directly to the casing spacer band of a casing spacer installed on a carrier pipe inside a casing.

As shown in FIG. 7, each side 27 of roller mount 21 preferably includes a hole 28 through which shoulder bolt 24 extends. Holes 28 should be axially aligned to ensure that wheel 22 rolls straight when casing spacer 10 is being pushed into or pulled through casing pipe 29, as shown in FIG. 4.

Wheel 22 is preferably manufactured from plastic via injection molding, or by some other method of molding. The plastic is preferably a durable, glass-reinforced nylon compound. The material of construction for wheel 22 is based on the anticipated weight of the load bearing on roller assembly 20 and the anticipated physical impacts wheel 22 will encounter during use. In all cases, the material of construction is preferably strong and flexible. Wheels 22 are also preferably manufactured from an electronically isolating material to prevent contact of dissimilar metals, thereby mitigating galvanic corrosion.

Wheel 22 preferably has an outer tread 30 that contacts the inner surface 31 of casing pipe 29 when casing spacer 10 is being pushed into or pulled through casing pipe 29. In addition, wheel 22 preferably has an inner bore 32 and an inner surface 33 equipped with one or more needle bearings 23.

The size of wheel 22 is typically determined by the anticipated weight of the load bearing on roller assembly 20. More specifically, the width and inner diameter of wheel 22 is typically determined by the availability of the types of needle bearings 23 that have adequate load ratings for the anticipated job. In addition, the outer diameter of wheel 22 can be determined by the desired annular gap between casing spacer 10 and casing pipe 29.

Figure 14:
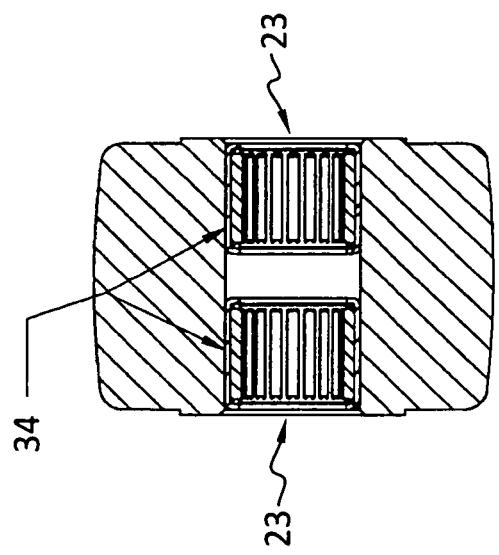
FIG. 14 is end view showing a section of a wheel taken along 14-14 of FIG. 13.
Figure 13:
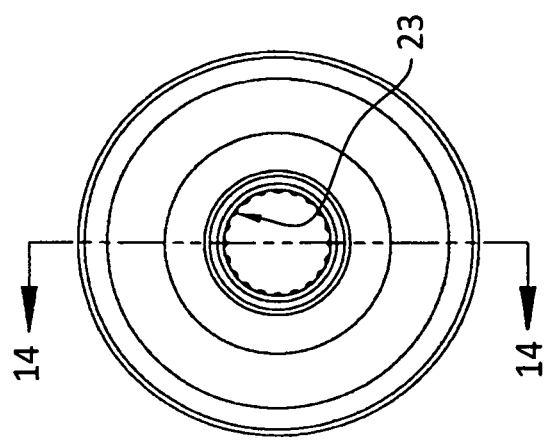
FIG. 13 is a side view of a wheel.

Needle bearings 23 can be used in pairs, as shown in FIG. 14, or alone based on the anticipated weight of the load bearing on roller assemblies 20. Special sizes of needle bearings 23 can be manufactured by any number of bearing manufacturers, but it is more economical to use sizes that are readily available on the market.

Needle bearings 23 are particularly suitable for the present invention because they have a high load rating per overall size ratio. Many commonly used casters/rollers consist of a single caged needle bearing assembly extending the width of the wheel. The diameters of the needle bearings for these casters/rollers must be relatively large to sustain heavy loads. The needle bearings 23 used with the present invention include an outer drum 34 that can be pressed into wheel 22 to provide a hardened race for the needles. Other casters/rollers contain a separate thick-walled cylinder installed into the wheel. For the present invention, wheel 22 provides the backing support and strength for outer drum 34 to maintain proper operation.

Shoulder bolt 24 is preferably manufactured from either steel, stainless steel, or similar material, and is preferably fabricated in the form of a shoulder bolt. Shoulder bolt 24 preferably extends completely through both holes 28 in sides 27 of roller mount 21 to provide a solid inner race for needle bearings 23. Shoulder bolt 24 is preferably hard enough to prevent excessive wear from the rotation of needle bearings 23. The hardness of shoulder bolt 24 eliminates the need for a separate hardened cylinder between needle bearings 23 and shoulder bolt 24, and therefore reduces the overall height of roller assemblies 20.

Axle nut 25 secures shoulder bolt 24 to roller mount 21. Axle nut 25 is preferably manufactured from a material that is similar to the material used to manufacture shoulder bolt 24 to prevent galvanic corrosion.

The present invention is useful in applications where the annular spacing between carrier pipe 12 and casing pipe 29 is less than two-and-a-half inches. Multiple roller assemblies 20 are attached to casing spacer 10 at the required angle, as needed, based on anticipated load from carrier pipe 12 and external weight. Multiple roller assemblies 20 can also be attached to runners 19 attached to casing spacer 10. The full length of carrier pipe 12 with casing spacers 10 can then be inserted inside casing pipe 29.

It is understood that at least one embodiment of the present invention has been disclosed by way of example and that other modifications and alterations may occur to those skilled in the art without departing from the scope and spirit of the present invention and the attached claims.

What is claimed is:

1. A low-profile casing spacer comprising:
   (a) a casing spacer band having an outer surface;
   (b) at least one roller mount attached to said outer surface of said casing spacer band, said at least one roller mount having a "C" channel shape consisting of a top that attaches to said outer surface of said casing spacer band, said "C" channel shape further consisting of two opposing sides extending from said top, where each opposing side has a hole axially aligned with said hole of said other opposing side;
   (c) a wheel rotatably placed between said two opposing sides of said at least one roller mount, said wheel having a bore and an axis of rotation aligned with said holes of said opposing sides, said bore having an inner surface;
   (d) a shoulder bolt extending through said bore of said wheel and said holes of said opposing sides of said at least one roller mount;
   (e) at least one needle bearing located between said shoulder bolt and said inner surface of said bore of said wheel; and
   (f) a nut for securing said shoulder bolt to said opposing sides of said at least one roller mount.

2. The low-profile casing spacer of claim 1, where said at least one roller mount is made of steel and is welded to said outer surface of said casing spacer band.

3. The low-profile casing spacer of claim 2, where said wheel is made from a durable, glass-reinforced nylon compound.

4. The low-profile casing spacer of claim 3, where said wheel is made from an electronically isolating material to minimize galvanic corrosion.

5. The low-profile casing spacer of claim 4, where said at least one needle bearing further comprises a set of needles and an outer drum for pressing into said wheel to provide a hardened race for said set of needles.

6. The low-profile casing spacer of claim 5, where said shoulder bolt is made of steel.

7. The low-profile casing spacer of claim 6, where said shoulder bolt is made of material with sufficient hardness to prevent excessive wear from rotation of said at least one needle bearing.

8. A low-profile casing spacer comprising:
   (a) a casing spacer band having an outer surface;
   (b) multiple risers extending outwardly from said outer surface of said casing spacer-band;
   (c) at least one roller mount attached to said outer surface of said casing spacer band, said at least one roller mount having a "C" channel shape consisting of a top that attaches to said outer surface of said casing, spacer band, said "C" channel shape further consisting of two opposing sides extending from said top, where each opposing side has a hole axially aligned with said hole of said other opposing side;
   (d) a wheel rotatably placed between said two opposing sides of said at least one roller mount, said wheel having a bore and an axis of rotation aligned with said holes of said opposing sides, said bore having an inner surface;
   (e) a shoulder bolt extending through said bore of said wheel and said holes of said opposing sides of said at least one roller mount;
   (f) at least one needle bearing located between said shoulder bolt and said inner surface of said bore of said wheel; and
   (g) a nut for securing said shoulder bolt to said opposing sides of said at least one roller mount.

9. The low-profile casing spacer of claim 8, where said at least one roller mount is made of steel and is welded to said outer surface of said casing spacer band.

10. The low profile casing spacer of claim 9, where said wheel is made from a durable, glass-reinforced nylon compound.

11. The low-profile casing spacer of claim 10, where said wheel is made from an electronically isolating material to minimize galvanic corrosion.

12. The low-profile casing spacer of claim 11, where said at least one needle bearing further comprises a set of needles and an outer drum for pressing into said wheel to provide a hardened race for said set of needles.

13. The low-profile casing spacer of claim 12, where said shoulder bolt is made of steel.

14. The low-profile casing spacer of claim 13, where said shoulder bolt is made of material with sufficient hardness to prevent excessive wear from rotation of said at least one needle bearing.

15. A low-profile casing spacer comprising:
   (a) a casing spacer band having an outer surface;
   (b) multiple risers extending outwardly from said outer surface of said casing spacer band;
   (c) at least one roller mount attached to at least one of said multiple risers extending outwardly from said outer surface of said casing spacer band, said at least one roller mount having a "C" channel shape consisting of a top that attaches to said at least one of said multiple risers, said "C" channel shape further consisting of two opposing sides extending from said top, where each opposing side has a hole axially aligned with said hole of said other opposing side;

(d) a wheel rotatably placed between said two opposing sides of said at least one roller mount, said wheel having a bore and an axis of rotation aligned with said holes of said opposing sides, said bore having an inner surface;

(e) a shoulder bolt extending through said bore of said wheel and said holes of said opposing sides of said at least one roller mount;

(f) at least one needle bearing located between said shoulder bolt and said inner surface of said bore of said wheel; and (g) a nut for securing said shoulder bolt to said opposing sides of said at least one roller mount.

16. The low-profile casing spacer of claim 15, where said at least one roller mount is made of steel and is welded to said at least one of said multiple risers.

17. The low-profile casing spacer of claim 16, where said wheel is made from an electronically isolating material to minimize galvanic corrosion.

18. The low-profile casing spacer of claim 17, where said wheel is made from a durable, glass-reinforced nylon compound.

19. The low-profile casing spacer of claim 17, where said at least one needle bearing further comprises a set of needles and an outer drum for pressing into said wheel to provide a hardened race for said set of needles.

20. The low-profile casing spacer of claim 19, where said shoulder bolt is made of steel.

21. The low-profile casing spacer of claim 20, where said shoulder bolt is made of material with sufficient hardness to prevent excessive wear from rotation of said at least one needle bearing.

* * * * *